April 21, 1942.　　　　　H. H. COX　　　　　2,280,480
OIL FILTER
Filed April 20, 1940　　　　2 Sheets-Sheet 1
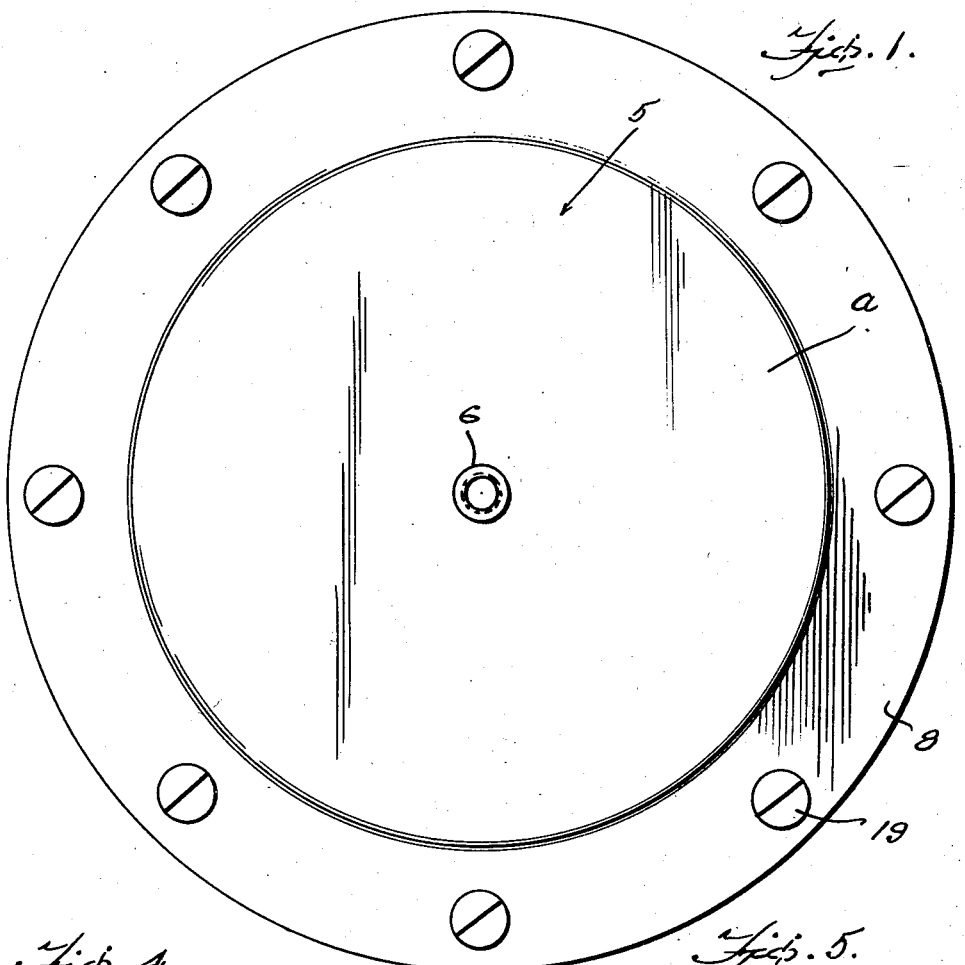
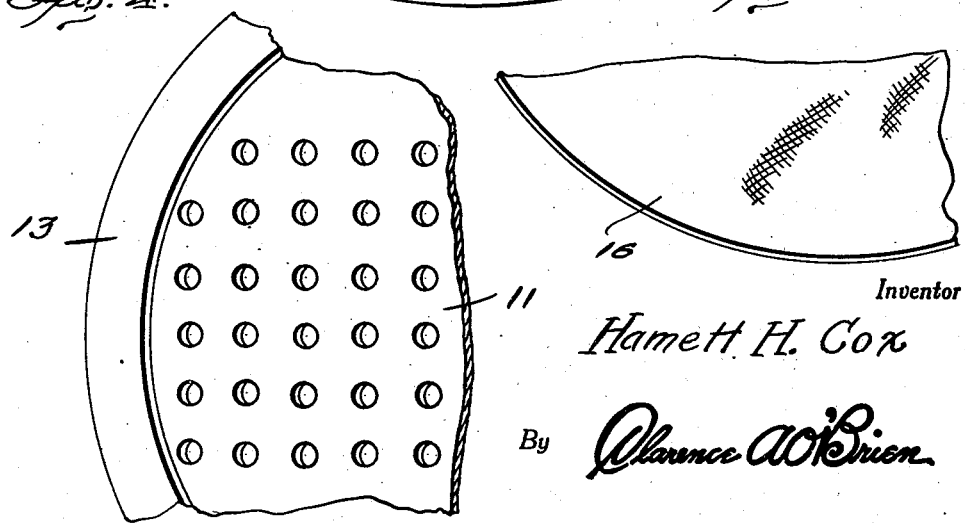
Inventor
Hamett H. Cox
By Clarence A. O'Brien
Attorney

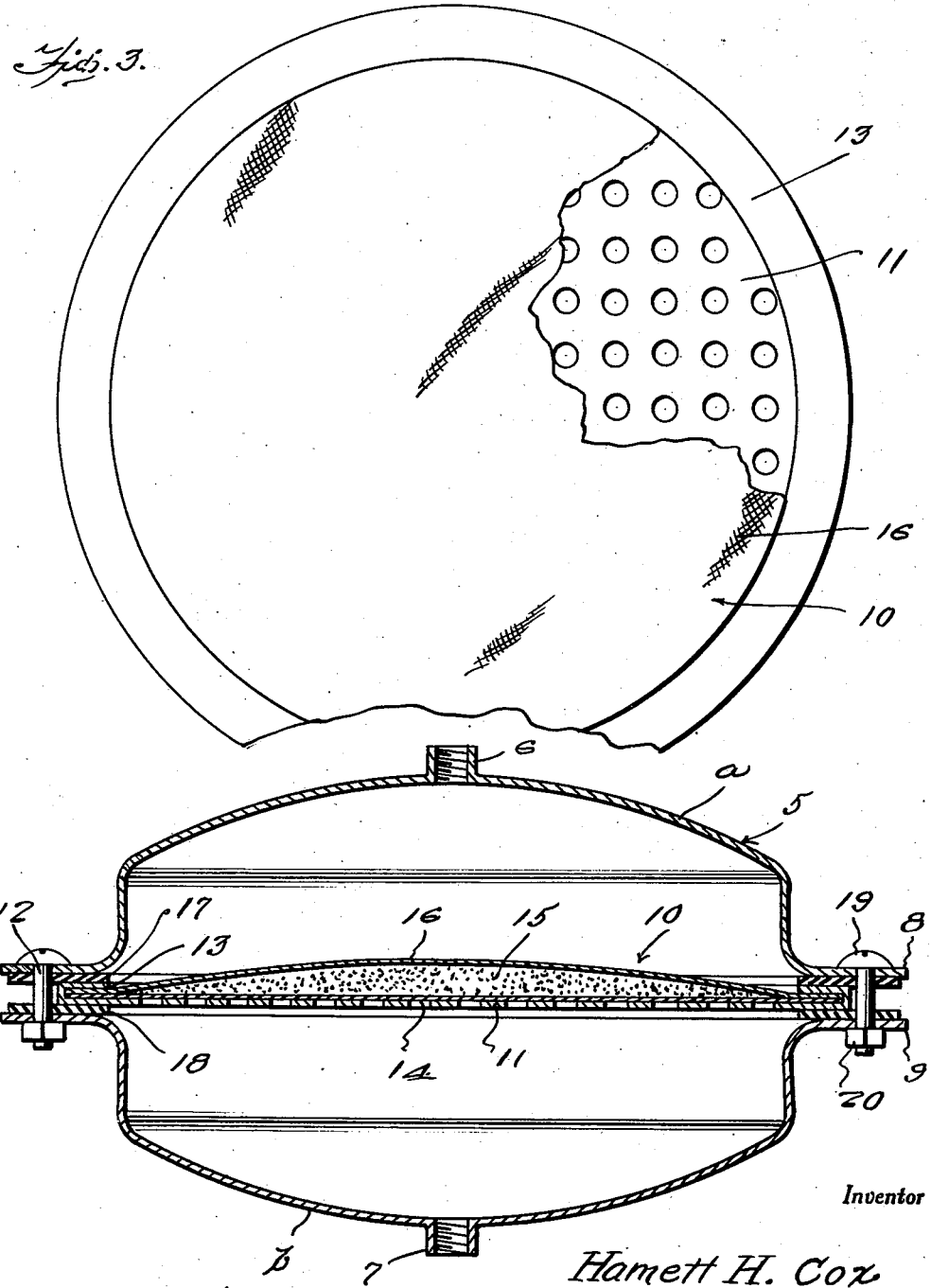

Patented Apr. 21, 1942

2,280,480

UNITED STATES PATENT OFFICE 2,280,480

OIL FILTER

Hamett H. Cox, Houston, Tex.

Application April 20, 1940, Serial No. 330,765

1 Claim. (Cl. 210—131)

This invention relates to new and useful improvements in oil filters and more particularly to an oil filter especially adapted for filtering crankcase oil.

An important object of the invention is to provide an oil filter, especially adapted for automobile use wherein the filtering element can be replaced from time to time by the automobile owner thus alleviating the expense attending the employment of an automobile mechanic for this purpose.

Another important object of the invention is to provide an oil filter which is of simple construction, yet thoroughly efficient in use.

These and other objects and advantages of the invention will become apparent to the reader of the following specification.

In the drawings:

Figure 1 represents a top plan view of the unit.

Figure 2 is a cross sectional unit.

Figure 3 is a top plan view of the filtering element.

Figure 4 is a fragmentary top plan view of the perforated plate.

Figure 5 is a fragmentary perspective view of a piece of the filtering cloth.

Referring to the drawings wherein like numerals designate like parts, it can be seen in Figure 1, that numeral 5 generally refers to the case which is made up of the upper section $a$ and the lower section $b$, these sections having inlet and outlet nipples 6 and 7, respectively.

The opposed portions of the sections $a$ and $b$ have out-turned flanges 8 and 9, respectively.

Numeral 10 generally refers to the filtering element and this consists of a perforated plate 11 having its edge portion disposed upwardly as at 12 and then inwardly over itself as at 13.

A piece of filtering cloth 14 is disposed over the plate 11 and upon this is placed and spread a mass of bone chacroal 15. Over this mass of charcoal is disposed the second filtering sheet 16. The sheets have their edge portions disposed under the inturned flange 13 of the perforated plate 11 and this flange is clinched down against the edge portions of the filtering cloth 14 and 16 to the end that the cloth will definitely hold the bone charcoal, forming a pocket therefor.

The periphery of the perforated plate 11 is interposed between cork gaskets 17 and 18 which, in turn, are interposed between the flanges 8 and 9 of the case sections $a$ and $b$. The flanges 8 and 9 are perforated to receive the bolts 19 which accommodate nuts 20. Obviously by tightening the bolts in place, a leak-proof connection can be made between the sections $a$ and $b$. Obviously, this filter will be on the outside of the motor or at some convenient position where the owner or attendant of a vehicle can readily reach the same and after separating the sections $a$ and $b$ replace the filtering unit 10, without any skilled assistance.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A filter comprising a case divided into a pair of sections, said sections having an inlet and an outlet for pipe connections, the opposed portions of the sections being provided with outwardly disposed flanges, a filtering element comprising a perforated plate, the edge portion of the plate being disposed inwardly to define a channel, a pair of filtering sheets, one disposed immediately against the perforated plate, a mass of filtering material between the sheets, the edge portions of the sheets being disposed together and in clamped relation by the inturned edge portion of the plate, said inturned edge portion of the plate being interposed between the flanges of the case sections, gaskets between the flanges of the case sections and the inturned channeled edge portion of the perforated plate, and securing means for securing the flanges with the gaskets in clamping engagement with the inturned channeled edge portion of the perforated plate.

HAMETT H. COX.